United States Patent [19]
Ader et al.

[11] Patent Number: 5,943,394
[45] Date of Patent: Aug. 24, 1999

[54] EVENT DETECTION SYSTEM WITH DIALER INTERCEPT

[75] Inventors: Richard Alan Ader, Monterey; Michael Andrew Chernoy, Salinas, both of Calif.

[73] Assignee: Detection Systems, Inc., Fairport, N.Y.

[21] Appl. No.: 09/044,110

[22] Filed: Mar. 19, 1998

[51] Int. Cl.⁶ .................................................. H04M 11/04
[52] U.S. Cl. ................................ 379/40; 379/45; 379/50
[58] Field of Search ........................... 379/37–51, 93.01, 379/93.05–93.08, 93.15, 354–356

[56] References Cited

U.S. PATENT DOCUMENTS

| | | | |
|---|---|---|---|
| 5,134,644 | 7/1992 | Garton et al. ............................ | 379/39 |
| 5,272,465 | 12/1993 | Meares, Jr. ............................. | 379/40 |
| 5,454,024 | 9/1995 | Lebowitz ................................ | 379/40 |
| 5,457,730 | 10/1995 | Rounds .................................. | 379/40 |
| 5,511,109 | 4/1996 | Hartley et al. ......................... | 379/40 |

*Primary Examiner*—Wing F. Chan
*Attorney, Agent, or Firm*—J. Addison Mathews

[57] ABSTRACT

A dialer intercept module is provided in an event detection system for automatically selecting between alternative communication channels and formats based on detected characteristics of control panel signals. More specific features detect predetermined signals, such as the telephone number dialed by the panel, or the type of alarm, and determine from the predetermined signals whether to: a) send the signal as is, over a publicly switched telephone network (PSTN); or, b) translate the signal into a different format suitable for an alternative channel, such as a wide area computer network.

24 Claims, 4 Drawing Sheets

EVENT DETECTION SYSTEM WITH DIALER INTERCEPT

DESCRIPTION

1. Field of Invention

The present invention relates to security and other event detection systems capable of communicating with remote locations, and more specifically to such systems having modules and techniques for selecting between multiple channels of communication. Typical security systems according to the invention include intruder detectors, fire detectors, personal security systems, water entry detectors and other event detectors typically found in a dwelling or commercial enterprise. The remote locations are usually base stations, monitoring services and/or responding personnel. The channels of communication include wired and wireless links, exemplified by publicly switched telephone networks (PSTN), wide area networks (WANs), computer networks and other public and private mechanisms, both analog and digital, for transmitting information between geographically remote locations.

2. Background of the Invention

Existing event detecting systems, such as fire and intrusion detection systems, frequently include an on-site control panel containing mechanisms for communicating alarm and other information to a remote monitoring station. The control panel includes a dialer with a controller and software for initiating the communications over a publicly switched telephone network (PSTN). The monitoring station, usually provided by a security service, decodes the communication, acknowledges receipt and takes other appropriate action. System status might be reported by the system and compared to a predetermined schedule in monitoring station memory. Discrepancies would then be identified by the monitoring station for action by the security service. Reported alarm conditions also might trigger a display of information about the alarm and a predetermined course of action.

In many situations, computer networks, radio frequency transmissions and other channels of communication have advantages over the publicly switched telephone network (PSTN). These advantages are made available to existing phone-based security systems by providing a communications control module between the security system control panel and the telephone network. The module intercepts the communication intended for the phone network and retransmits the intercepted communication in a proper format for the alternative channel. The module also returns acknowledgement signals to the panel in the format the panel expects to receive from the phone network. Although the existing security system operates the same as it would communicating over a publicly switched telephone network (PSTN), the module acts as a translator providing the proper format in both directions for communicating over the alternative channel.

An example of such a module is disclosed in Garton U.S. Pat. No. 5,134,644, issued Jul. 28, 1992. According to Garton, the system operator selects and sets the module for telephone communications or radio frequency communications. When telephone communications are selected, the module passes the control panel signal to the telephone lines without modification. When radio frequency communications are selected, the module intercepts the communication and translates the signals into an alternative format for radio transmission. If the radio frequency channel fails, the module reverts automatically to the telephone channel.

SUMMARY OF THE INVENTION

The present invention is directed to improvements in security systems that communicate with remote locations. Briefly summarized, according to one aspect of the invention, a dialer intercept module is provided for automatically selecting between multiple communication channels and formats based on signals from the security system. More specific features detect signals, such as the telephone number dialed by the panel, or the type of alarm, and determine from the detected signals whether to: a) send the communication as is; or, b) translate the communication into a different format. In a typical application, a format appropriate for a publicly switched telephone network might be translated into a format suitable for a wide area digital network such as a computer network. According to another more specific feature, such a module also responds to overriding command signals from a remote station, selecting the communication channel and format in accordance with the overriding command.

According to another aspect of the invention, an interface module is provided in an event detection system for selecting between one or more alternative communication channels based on information provided by the control panel or contained in the communication. The module includes a detector for determining the information and a channel selector for selecting between an intercepting mode and a non-intercepting mode, depending on the detected information. According to more specific features of this aspect, the module also includes a reformatting mechanism for reformatting information communicated in the intercepting mode.

The invention provides alternative communications options for panels not otherwise having such options. The addition of network communications reduces phone bills, permits supervised communications links with improved line security and adds communications back-up capability.

These and other features and advantages of the invention will be more clearly understood and appreciated from a review of the following detailed description of the preferred embodiments and appended claims, and by reference to the accompanying drawings.

DETAILED DESCRIPTION OF THE INVENTION

Figure 1:
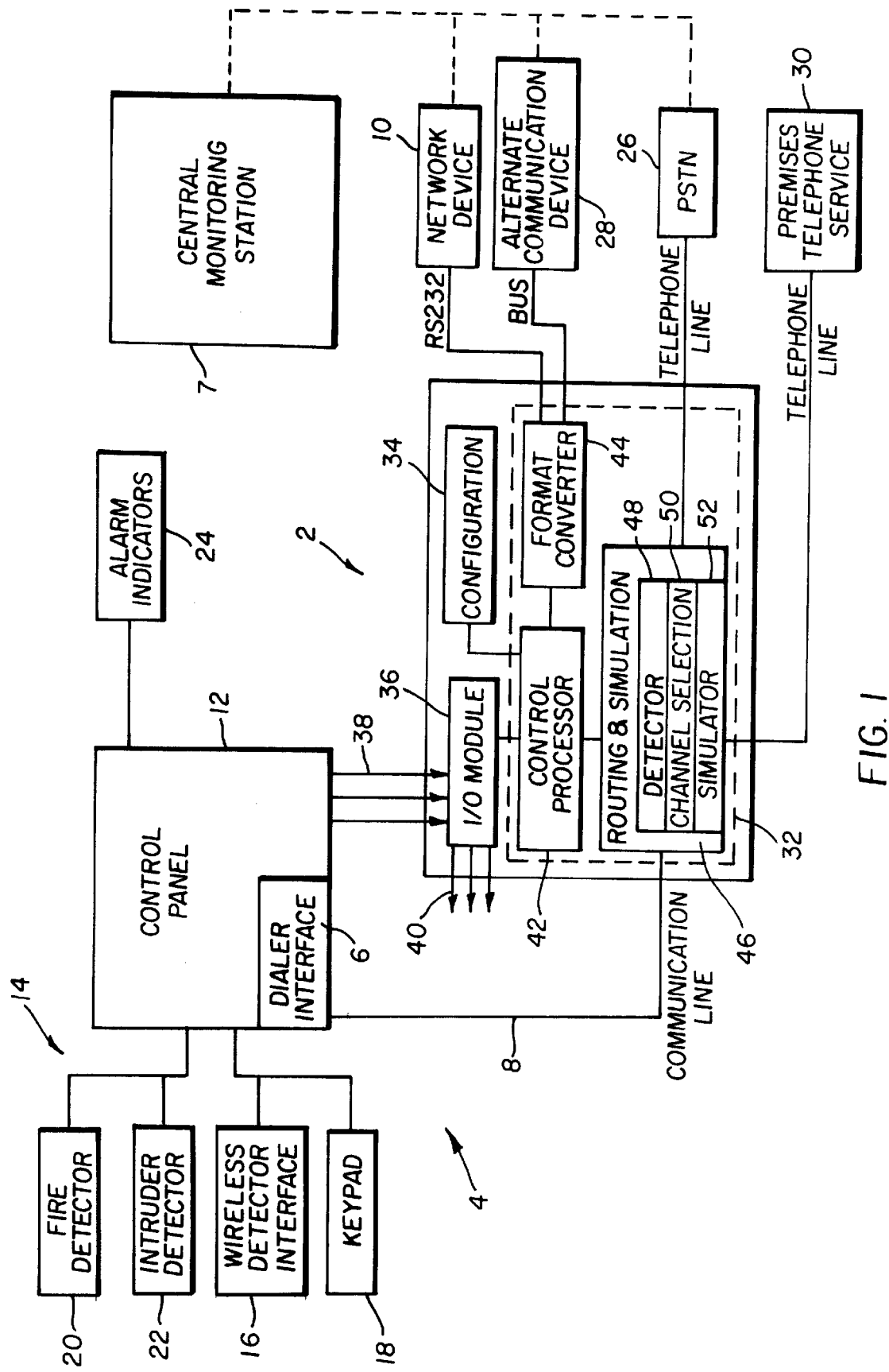
FIG. 1 is a box diagram of a security system including an intercept module according to a preferred embodiment of the invention.

Referring now to a preferred embodiment of the invention, and beginning with FIG. 1, a dialer intercept module 2 is disclosed with a security or other event detection system 4.

The intercept module 2 has particular utility for improving existing security systems that use a dialer interface 6, sometimes called a dialer, auto-dialer or digital dialer, to communicate with a remote central monitoring station 7 through a publicly switched telephone network (PSTN) 26. In such systems, the dialer interface 6 dials a predetermined telephone number to initiate communications with the monitoring station. Communications are established using predetermined formats and the data is transmitted by the panel through the interface. The data might include status reports or information about an alarm condition, such as a fire, intrusion or personal emergency.

The intercept module 2 is coupled through communications line 8, to the dialer interface 6, and improves performance of the system by adding alternative communications capabilities. With intercept module 2, wide area digital or other communications channels can be employed to complete the communications and transmit data between the security system 4 and the monitoring station 7. The intercept module selects the channel and translates between the required formats. In this preferred embodiment the added channel is a computer network 10, and the intercept module translates between panel formats used for telephone line communications and other formats used in the computer network. It also simulates signals the dialer interface normally would receive from the monitoring station, so the security system stays on-line until the communications are completed and properly terminated.

According to an important feature of the invention, the intercept module 2 operates automatically to select a communications channel and format based on predetermined signals from the security system. Examples of such predetermined signals include the telephone number dialed by the dialer interface 6, the type of alarm reported, or a logic level determined by the control panel. In one preferred example, the intercept module 2 is configured to intercept communications from the dialer interface 6 and redirect the intercepted communication to a computer network, translating the communication in both directions between the panel format and the format of the added or alternative communication channel. If the communication is notification of a fire alarm, however, the intercept module 2 does not intercept the communication, and the communication proceeds with panel formats through the publicly switched telephone network (PSTN). In other examples, the decision to intercept, or not, might be based on the dialed telephone number, a logic state, or other information provided by the control panel or included in the communication. According to an additional feature indicated above, commands from the monitoring station 7 might reconfigure the intercept module, changing its decision criteria, or overriding the local decision.

Most of the components and features of security system 6 are well known to those skilled in the art, and will not be described in detail here. Briefly, however, the system includes an event reporting alarm control panel 12, coupled to a plurality of event detectors 14, wireless detector interfaces 16 and keypads 18. The event detectors 14 are located throughout a protected region for detecting security related events such as fire, intrusion or personal emergency. Depicted are a fire detector 20, and intruder detector 22, which may be selected from a wide variety of such detectors well known to those skilled in the art. The wireless detector interfaces 16 communicate with other similar event detectors that use radio or wireless technologies for transmitting information about detected events to the interfaces 16 and control panel 12. The keypads 18 provide for data interchange with the control panel and control of system status and functions. In addition to input keys, such keypads typically include display capabilities presenting information about the system and its operation.

The control panel 12 includes signal processors, microprocessors and other well known components for analyzing signals from the detectors 14, interfaces 16 and keypads 18.

When an alarm signal is received, the panel actuates local alarm indicators 24, typically including strobe lights, horns or sirens and light emitting diodes (LEDs), or other local displays. In addition to the local alarm indicators, the panel uses the dialer interface 6, including a dialer, for communicating with the remote or central monitoring station 7 and reporting the alarm condition. As mentioned above, the control panel and its dialer interface are designed for communicating over a publicly switched telephone network (PSTN) 26 using panel formats, typically frequency shift keying or dual tone multi-frequency (DTMF). Confirmations and acknowledgements are received from the monitoring station 7 in corresponding formats.

The control panel and dialer interface may also communicate with the monitoring station when there is no alarm, to transmit reports, status information, and the like, or to receive information and commands from the monitoring station.

Dialer intercept module 2 is coupled to the alarm panel 12 through communications line 8, between the dialer interface 6 and a plurality of alternative communications lines or channels. In a typical installation, the intercept module 2 might have a single input channel, line 8, and two output channels, one for the publicly switched telephone network (PSTN) 26, and another for the computer network 10. For the purpose of this description, however, a third channel is depicted for an alternative communications device 28. Although the output channels preferably include an analog telephone line and a digital data line, other alternatives are within the scope of the invention, including wired and wireless links, internets, intranets and buses, wide area digital networks and other public and private communications mechanisms, both analog and digital, for transmitting information between geographically remote locations.

The terms input and output channels are used above, indicating the direction of primary communications originating from the control panel 12. It should be recognized, however, that communications also occur in the opposite direction, including acknowledgements and commands from the monitoring station.

The box depicted as 30 represents a connection to the telephone service on the premises with the control panel, and provides for taking over the local telephone service under certain circumstances that will be described hereinafter.

Intercept module 2 includes a channel selector and format converter 32, configuration panel 34 and input/output module 36.

The configuration panel 34 provides switches and the like for configuring the intercept module 2. In the preferred configuration, the module normally will intercept communications from the control panel 12 and redirect the communications to the computer network 10. When a fire alarm is received, however, the communications are not intercepted and are permitted to proceed over the publicly switched telephone network (PSTN). Other configurations that can be set at the configuration panel include: the reverse of the above, i.e. the normal mode is non-intercepting; other detected characteristics, such as other alarm types, phone numbers, logic states in the communicated signal or other signal characteristics; and back-up contingencies in case one or more of the communications channels fail.

Although all of the signal information required for operation of the interface module 2 might be determined from the communication over line 8, in this preferred embodiment selected information is obtained by input/output module 36, through the couplings 38, with relay outputs in the alarm panel. The input/output module determines when the dialer interface 6 is active, for example, and when a fire detector is reporting a fire, or when a fire alarm occurs. Outputs 40 from the input/output module includes light emitting diodes (LEDs) that warn when communications are lost with the monitoring station by one or more of the communications channels.

The channel selector and format converter 32 Includes a control processor 42, format converter 44 and a routing and simulation mechanism 46.

The control processor 42 controls the intercept module and its components including the protocol converter 44 and the routing and simulation mechanism 46.

The format converter 44 changes the format of the communications in both directions. In the preferred embodiment, communications from the alarm panel 12 are in formats suitable for one channel of communication, such as publicly switched telephone network (PSTN), and are translated by the converter 44 into formats suitable for another channel of communication, such as a computer network. As mentioned above, other networks and communications channels might be employed, in which case the converter 44 would translate between the appropriate formats for each respective channel.

The term communications format is used throughout this specification to mean the structure of the data, often called packet structure, the communications protocols, and/or other representation of the transmitted data. In a sense, the format is a code, language or set of rules that present the transmitted data in a form appropriate for the respective communication channel. This includes handshake procedures that initiate the communication, the structure of the transmitted data during the communication and /or kiss-off procedures after the communication is concluded.

The routing and simulation mechanism 46 includes a detector 48 for detecting predetermined signals from the alarm panel 12, either from communications line 8 or input/output module 36, a channel selector 50 and a simulator 52.

Examples of the predetermined signals detected by detector 48 have already been mentioned, including telephone numbers, alarm types, logic levels and other signals and signal characteristics from the alarm panel 12.

The channel selector 50 selects the communications channel based on the predetermined signals. Again, in the preferred embodiment, and as already mentioned above, if the communication is a fire alarm, it is not intercepted, and the channel selector 50 directs the communication over the publicly switched telephone network (PSTN) 26. Other communications are intercepted and redirected by the channel selector to a wide area digital network depicted as computer network 10.

Simulator 52 simulates signals, such as acknowledgements, that ordinarily would be returned to the alarm panel 12 in the same format used by the alarm panel. The simulator keeps the alarm panel 12 and dialer interface 6 on line so the dialer intercept module 2 has time to carry out its functions.

Figure 2:
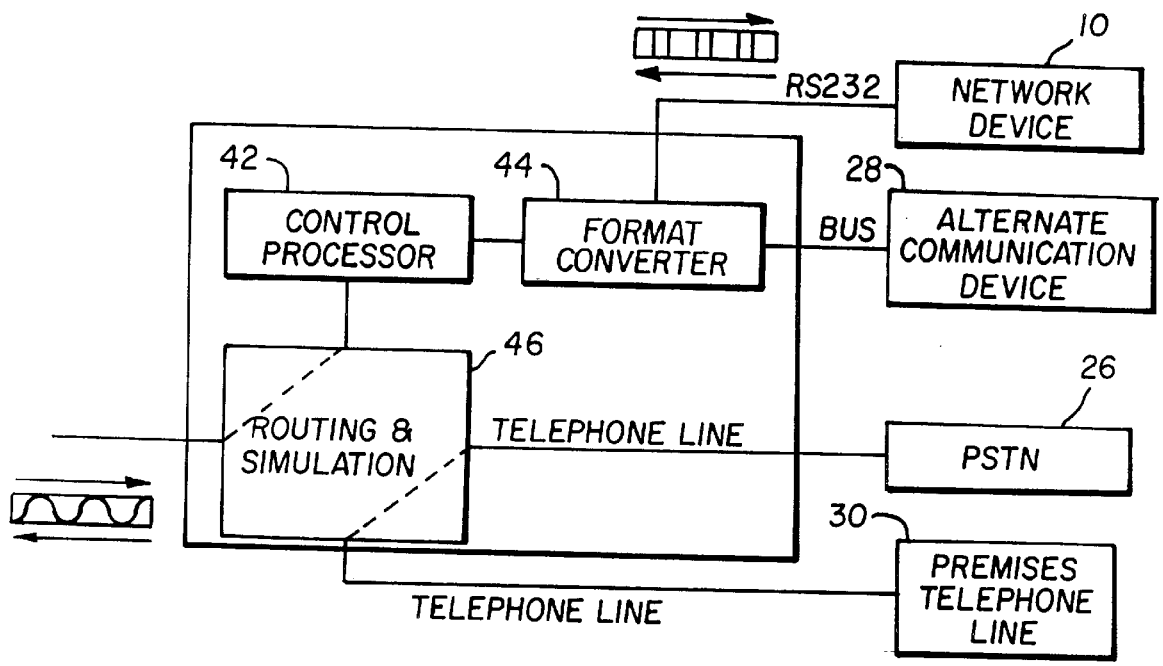
FIGS. 2 and 3 are box diagrams depicting alternative communication channels determined by the intercept module of the embodiment of FIG. 1.
Figure 3:
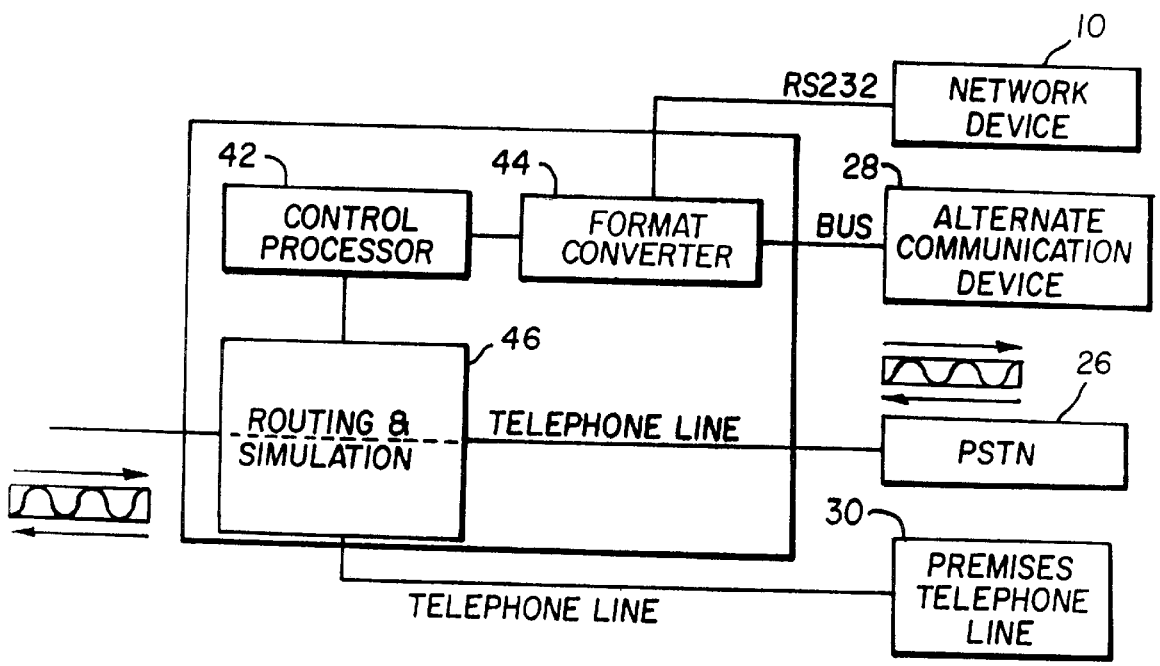

FIGS. 2 and 3 depict the operation of the routing and simulation mechanism 46 to select between alternative channels of communication. FIG. 2 represents the default mode, which intercepts the communication and redirects it to the computer network 10. In this mode, the premises telephone service 30 is not interrupted. FIG. 3 represents the channel selection for a fire alarm, and also a fallback mode if the default mode fails for some reason. The panel communications are not intercepted and remain on the publicly switched telephone network (PSTN) 26. The premises service 30 also is taken over or interrupted to insure completion of any alarm communication.

Figure 4:
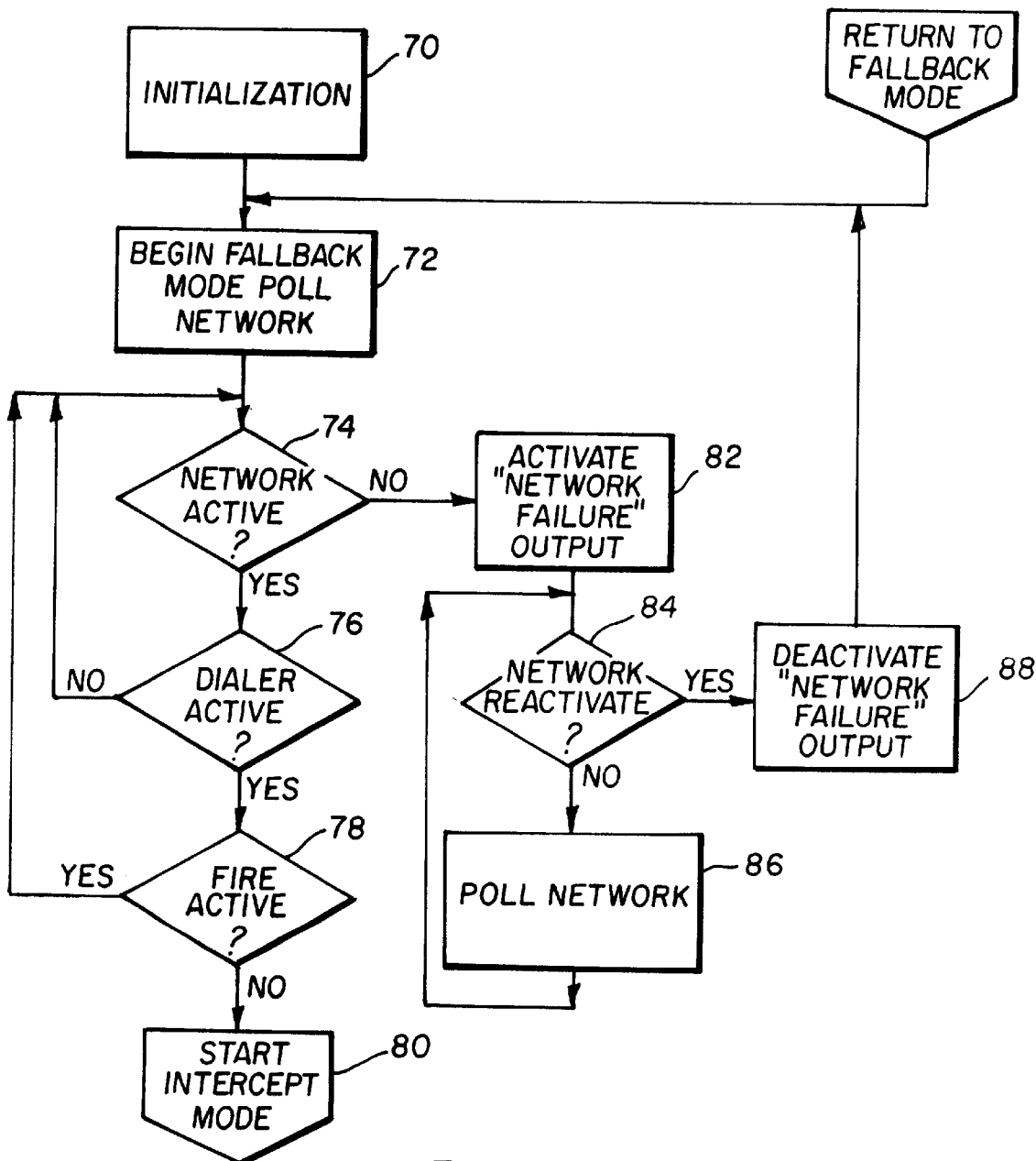
FIGS. 4 and 5 are flow diagrams depicting the operation of the FIG. 1 preferred embodiment.
Figure 5:
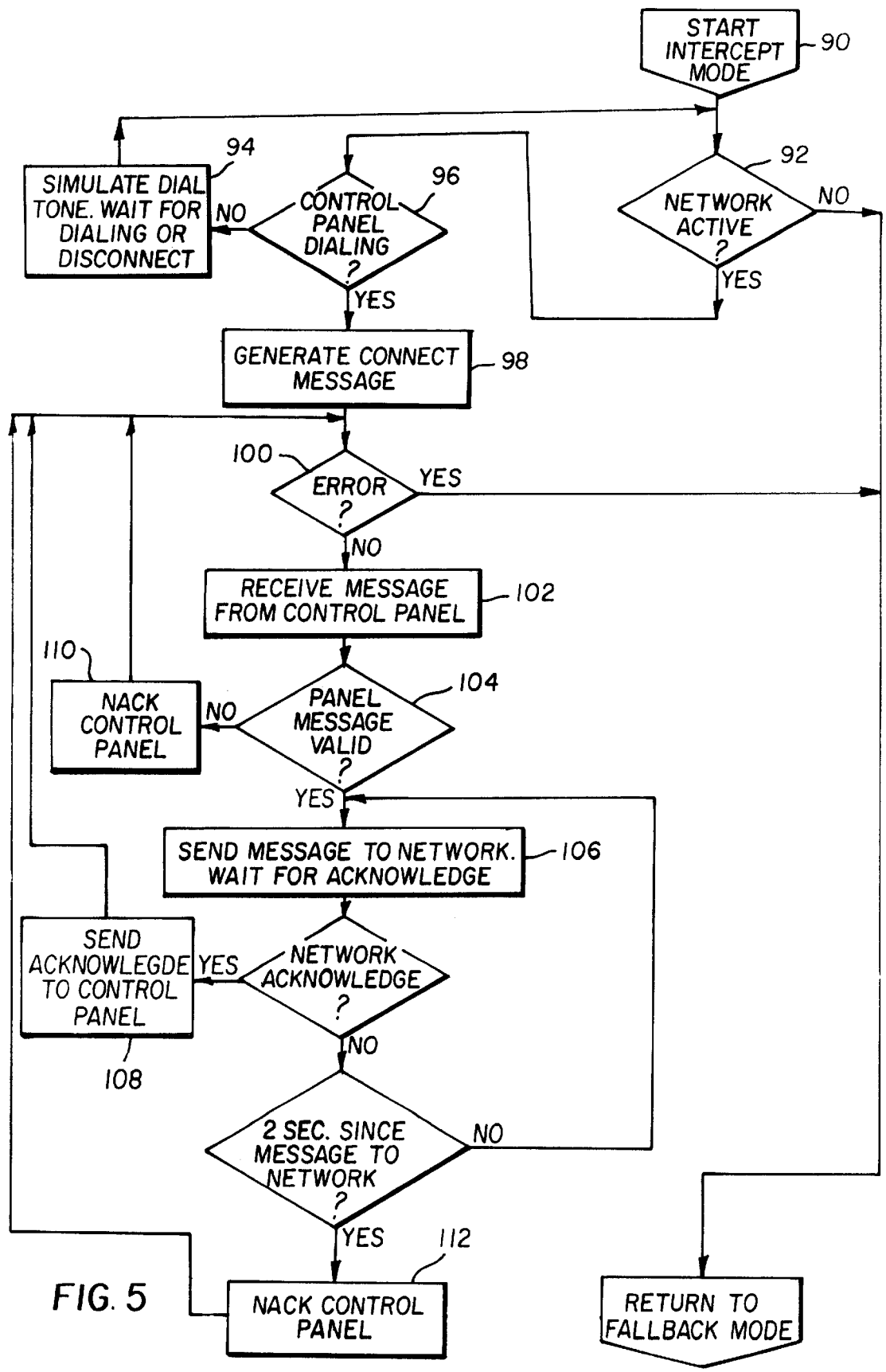

Referring now to FIGS. 4 and 5, the operation of the intercept module is depicted in flow diagrams. At initialization, box 70, the intercept module 2 begins in a fallback mode, box 72, which does not intercept communications from the dialer interface 6. Communications in the fallback mode proceed through the publicly switched telephone network (PSTN) 26, as if the intercept module 2 were not present.

The intercept module polls the network device 10, box 74. If the network is active, the intercept module proceeds to check for dialing, box 76, and a fire alarm, box 78. When the network is active, the dialer 6 is dialing and the panel is not indicating a fire alarm, the intercept module starts the intercept mode, box 80. Otherwise, the system remains in fallback mode. As already mentioned, fire alarms are not intercepted so they proceed over the publicly switched telephone network (PSTN) 26. Similarly, if the network is not working, the intercept module goes into a "network failure" mode, boxes 82, 84, 86 and 88, and indicates the failure through input/output module 36 (FIG. 1).

In the intercept mode, box 90 (FIG. 5), the intercept module continues to check the network, box 92. When the network is active, the intercept module may simulate a dial tone, box 94, so the panel 12 believes it is coupled to the telephone network. When the control panel dials a telephone number, box 96, the intercept module generates a "connect message," box 98, for the panel 12, again so the panel receives the same signals it expects from a telephone communication. If there are no errors, box 100, the intercept module receives the communication from the panel 12, box 102, checks its validity, box 104, and sends the message over the computer network 10 to the remote station 7, box 106. Acknowledgements from the remote station are returned over the network and through the intercept module to the dialer interface 6, box 108. In addition to errors, box 100 returns the system to the fallback mode when such acknowledgement is received. Box 110 indicates a NACK (negative acknowledge, send again) command sent to the panel 12 when the panel message is not understood, or if more time is required. Box 112 indicates a NACK command sent to the panel 12 when no acknowledgement is received from the remote station triggering the panel to resend its original communication.

It should now be apparent that an improved intercept module, according to the invention, automatically selects between alternative communications paths based on information from the security system control panel. Currently installed systems can communicate using technologies for which they were not originally designed, reducing phone bills, facilitating supervised communications links with improved line security and adding communications back-up capacity.

While the invention is described in connection with a preferred embodiment, other modifications and applications will occur to those skilled in the art. The claims should be interpreted to fairly cover all such modifications and applications within the true spirit and scope of the invention.

PARTS LIST

Reference No. Part

2. Dialer intercept module.
4. Security system.

6. Dialer interface.
7. Remote central monitoring station.
8. Communications line.
10. Computer network.
12. Alarm control panel.
14. Event detectors.
16. Wireless detector interfaces.
18. Keypads.
20. Fire detector.
22. Intruder detector.
24. Local alarm indicators.
26. Publicly switched telephone network (PSTN).
28. Alternative communications device.
30. Premises telephone service.
32. Channel selector and format converter.
34. Configuration panel.
36. Input/output module.
38. Panel couplings.
40. Outputs.
42. Control processor.
44. Format converter
46. Routing and simulation mechanism.
50. Detector.
48. Channel selector.
52. Simulator
70–112 (even Nos.). Flow diagram.

We claim:

1. A dialer intercept module selecting between a plurality of channels for communications between an event reporting panel and a remote station; said module comprising:
   a detector detecting signals from said alarm panel; and,
   a channel selector: a) selecting a respective channel from said plurality of channels based on said detected signals; and, b) directing said communications over said selected channel.

2. The invention of claim 1, wherein one of said channels is a publicly switched telephone network and another of said channels is an electronic data network.

3. The invention of claim 2, wherein said detected signals include a telephone number dialed by said alarm panel.

4. The invention of claim 1, wherein said detected signals identify an alternative alarm type selected from a fire alarm type and a non-fire alarm type.

5. The invention of claim 1, wherein said detected signals include logic levels transmitted by said panel.

6. The invention of claim 1, wherein said communications from said panel have a panel format and said module selects between: a) intercepting said communications and transmitting said communications in a format different from said panel format or b) not intercepting said communications.

7. The invention of claim 6, wherein said transmission is over a digital network.

8. The invention of claim 1, wherein said channel selector responds to signals from said remote station to override said selection.

9. A communications module for use with an event reporting panel, the panel including an interface for dialing a number and transmitting data over a telephone network to a station identified by said number, the communications module comprising:
   a detector detecting predetermined signals from said panel;
   a channel selector selecting between an intercepting mode and a non-intercepting mode based on said detected signals; and,
   a reformatting mechanism reformatting said transmitted data in said intercepting mode.

10. The invention of claim 9, wherein said reformatting mechanism, in said intercepting mode, translates between one format suitable for digital network communications and another format suitable for publicly switched telephone network communications.

11. A dialer intercept module for use with a event reporting control alarm panel, the alarm panel including a device for communicating in a panel communications format with a remote station, the intercept module comprising:
   a detector coupled to said panel and detecting predetermined signals from said panel; and,
   a format converter for translating said panel communications format into alternative communications formats based on said detected signals.

12. The invention of claim 11, wherein said panel communications format includes a packet structure and said module: a) leaves said communications in said packet structure of said panel; or, b) translates said communications into a different packet structure, depending on said predetermined signals from said panel.

13. The invention of claim 11, wherein said panel communications format includes a panel protocol and said module: a) leaves said communications in said panel protocol; or, b) translates said communications into a different protocol, depending on said predetermined signals from said panel.

14. The invention of claim 11, wherein said predetermined signals include said dialed number.

15. The invention of claim 11, wherein said predetermined signals identify an alternative alarm type.

16. The invention of claim 11, wherein said predetermined signals represent a logic level in said alarm panel.

17. The invention of claim 11, wherein said module selects between: a) retransmitting said panel communications in a format different from said panel communications format; or, b) passing said panel communications in said panel communications format.

18. The invention of claim 17, wherein said module responds to signals from said remote station to override said selection.

19. A communications intercept module for use with an event detection system, the system including a device for generating signals and transmitting alarm data, to a remote station; said module comprising:
   a detector for determining information from said signals;
   a mode selector for selecting between a first mode and a second mode, depending on said detected information; and,
   a reformatting mechanism reformatting said data in said first mode and passing said data without reformatting in said second mode.

20. The invention of claim 19, wherein said detected information includes a telephone number dialed by said system.

21. The invention of claim 19, wherein said signals identify an alternative alarm type selected from a fire alarm type and a non-fire alarm type, and wherein said information includes said identified alarm type.

22. The invention of claim 19, wherein said information includes logic levels in said signals from said system.

23. A dialer intercept module selecting between a plurality of channels for communications between an alarm panel and a monitoring station; said module comprising:
   a detector detecting characteristics of said signals from said panel;
   a channel selector: a) selecting one or more channel from said plurality of channels based on said detected characteristics; and, b) directing said communications over said selected channels.

24. A dialer intercept module for use with a alarm panel, the alarm panel including a device for dialing a number and transmitting alarm data to a remote station identified by said number, the intercept module comprising:

a detector detecting characteristics of said data; and, a data converter changing said data based on said detected characteristics.

* * * * *